UNITED STATES PATENT OFFICE.

R. B. FITTS, OF PHILADELPHIA, PENNSYLVANIA.

IMPROVEMENT IN TREATING NIGHT-SOIL.

Specification forming part of Letters Patent No. 36,399, dated September 9, 1862.

*To all whom it may concern:*

Be it known that I, R. B. FITTS, of the city of Philadelphia, in the State of Pennsylvania, have invented a new and useful improvement in the method or process of treating and putting up night-soil for transportation and agricultural purposes; and I do hereby declare that the following is a full and exact description of the same.

The best methods in use for treating night-soil for transportation and use are slow and expensive; and my method or process, which will lessen the cost without impairing the usefulness of this valuable manure, will be of great benefit to the public.

To accomplish this result is the chief object of my invention.

It consists, as hereinafter described, in separating from the watery portion of night-soil most of the phosphoric acid and ammonia by precipitating them chemically and mechanically with the more solid portions, running off the superfluous water, and then mixing the residue with an additional portion of charcoal and sulphate of lime, in connection with about one per cent. (of the night-soil) of chloride of sodium or common salt, into a thoroughly-mixed semi-fluid condition, and finally putting it up in this condition in tight barrels for transportation and subsequent use for agricultural purposes.

To enable others to understand and practice my invention, I will proceed to describe more minutely the method or process.

I first screen the night-soil to remove sticks, broken glass, &c., into vats or tanks for treatment. I then sift into the vats equal parts of sulphate of lime and charcoal, finely pulverized, agitating or mixing the whole together in the proportion of about ten parts of the sulphate of lime and charcoal to one hundred parts of the night-soil. I then let the solid parts precipitate, with such salts from the urine as may have combined with the sulphate of lime, as phosphate of lime and sulphate of ammonia, and again sift into the vats in a fine shower-like manner, so as to cover the whole surface of the supernatant fluid therein, about half the quantity previously used of the sulphate of lime and charcoal, which, in precipitating through the water, carries down all the remaining portions of ammonia and phosphoric acid which may have remained in solution therein after the first precipitation. The supernatant water is now run off to waste, and to render the remainder more perfectly free from offensive exhalation and from subsequent fermentation I mix into it a small portion more of the sulphate of lime and charcoal and about one part of chloride of sodium or common salt to one hundred parts of the whole product, and finally put it up in tight barrels for transportation.

Previous to using, the contents of the barrels should be mixed with about twelve or fifteen times its bulk of good loam or meadow-muck as an absorbent and allowed to remain for a few days before being applied to the land.

What I claim as my invention, and desire to secure by Letters Patent, is—

The method or process of treating and putting up night-soil for transportation and agricultural purposes, substantially as described.

R. B. FITTS.

Witnesses:
BENJ. MORISON,
JNO. EDWIN POTTER.